Nov. 16, 1965    R. J. ANETSBERGER    3,217,704
DEEP FAT PRODUCTION FRYERS

Filed March 24, 1964    2 Sheets-Sheet 1

INVENTOR.
Richard J. Anetsberger
BY
Horton, Davis, Brewer & Brugman
Attys.

Nov. 16, 1965  R. J. ANETSBERGER  3,217,704
DEEP FAT PRODUCTION FRYERS
Filed March 24, 1964  2 Sheets-Sheet 2

INVENTOR.
Richard J. Anetsberger
BY
Horton, Davis, Brewer & Brugman
Attys.

United States Patent Office 3,217,704
Patented Nov. 16, 1965

3,217,704
DEEP FAT PRODUCTION FRYERS
Richard J. Anetsberger, Northbrook, Ill., assignor to Anetsberger Brothers, Inc., Northbrook, Ill., a corporation of Illinois
Filed Mar. 24, 1964, Ser. No. 354,380
8 Claims. (Cl. 126—391)

This invention relates in general to food production equipment, and more particularly to deep fat fryers.

The primary difficulty encountered in production deep fat frying is in trying to obtain relatively rapid fat temperature recovery, following immersion of the food to be cooked in the oil, while preventing rapid deterioration of the oil, particularly that resulting from burning and sticking to the heated cooking pot walls of particles dislodged from the food.

One attempted solution has been the provision of tube fryers, but they are very difficult to keep clean, particularly under the tubes, and heat from their burners is conducted or transmitted by the tube walls directly to the cooking fat in all directions so as to heat the fat below the tubes to substantially the same degree as above them.

A principal object of this invention is to eliminate the disadvantages of tube fryers and to obtain maximum speed of fat temperature recovery, or a minimum oil temperature recovery time, while providing a truly effective cool zone at the bottom of the pot in which dislodged food particles will collect and which thereby will prevent burning of such particles. This object is accomplished by providing a novel pot bottom construction defining parallel combustion chambers extending from front to rear for the full length of the pot and each formed by a pair of substantially vertical walls which slope or have their upper portions tilted toward each other, are joined at their upper ends, and have their lower ends extending below the combustion chamber and joined to the next adjacent vertical or substantially vertical wall. This provides laterally separated cool zones at the lower part of the pot bottom below the combustion chambers and at either side thereof.

To insure effective operation of these cool zones, high draft burner means are employed which are positioned at the front ends of the combustion chambers and direct their flames rearwardly and substantially horizontally, and baffle means or heat shields are provided for defining the bottoms of the combustion chambers and preventing direct application of heat from the burners against the walls defining the cool zones, as contrasted with a tube fryer in which the lower portions of the tubes transmit burner heat to the fat to the same extent as do the upper portions of the tubes.

Another important object of the invention is to obtain rapid and uniform heating of the side and top walls of such a horizontally extending combustion chamber by mounting the head of a burner in substantially blocking relation to the front end in the combustion chamber, the burner head being imperforate except for apertures in its rearwardly disposed face for directing flames into the chamber in conjunction with primary air supplied from below, with marginal spacing between the burner head and combustion chamber walls as will provide a Venturi-like or aspirating effect and the only inlet for secondary air.

A further object is to facilitate collection and removal of crumbs or dislodged food particles in the pot at the bottom of the cool zones laterally of and below the combustion chambers by providing a drop-off or vertical wall portion substantially centrally of each cool zone connected at its lower end with a forwardly and downwardly sloping bottom extending from the rear of the pot, with a drain aperture in each such vertical wall. To simplify drainage, tubes are connected individually at their rear ends to those apertures and joined at their forward ends to a valved fitting.

Numerous other objects and advantages of the invention will be apparent as it is better understood from the following description, which, when taken in connection with the acompanying drawings, discloses a preferred embodiment thereof.

Figure 1:
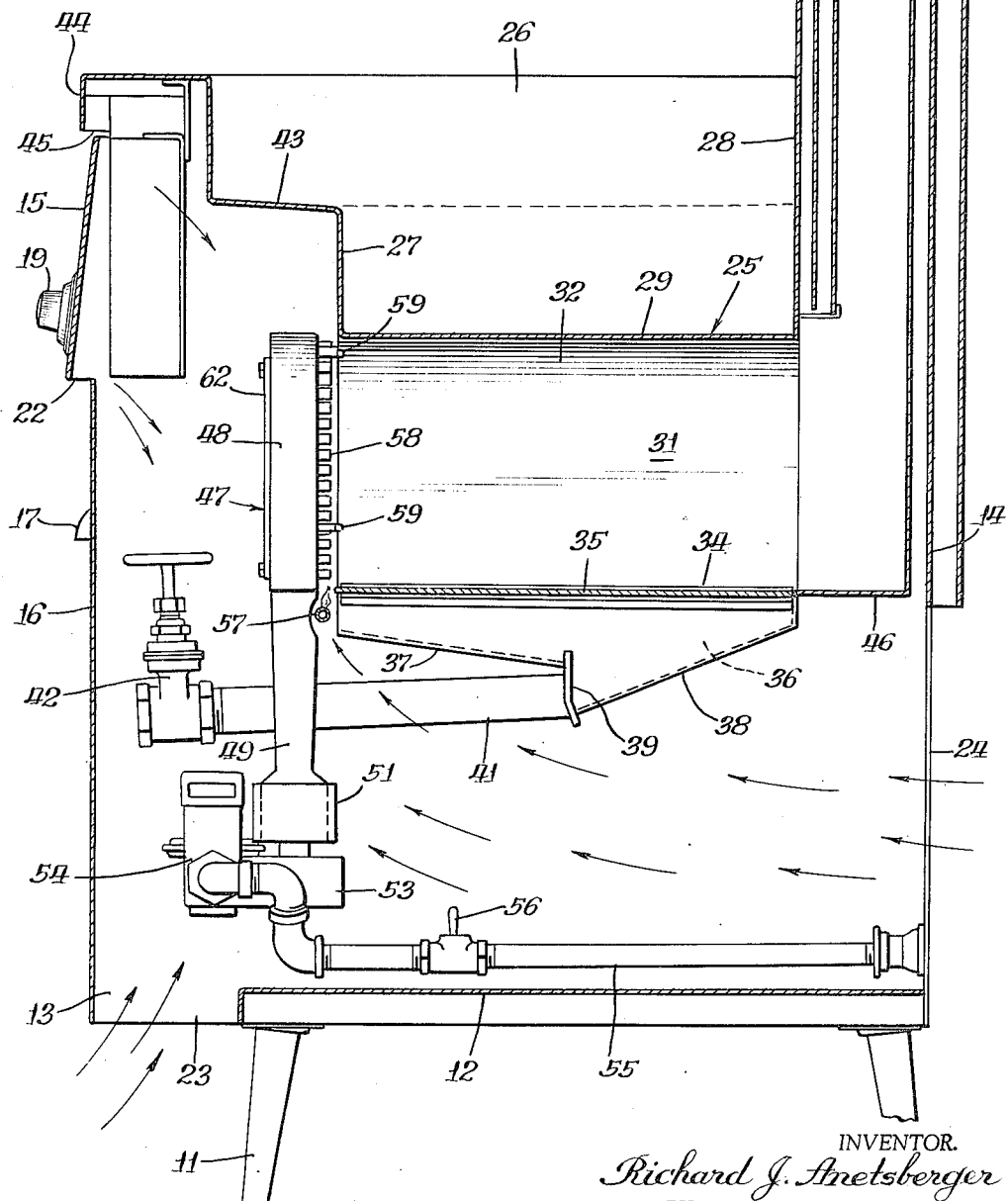
FIGURE 1 is a vertical section through a deep fat fryer embodying the features of the invention shown in a plane extending from front to rear.
Figure 2:
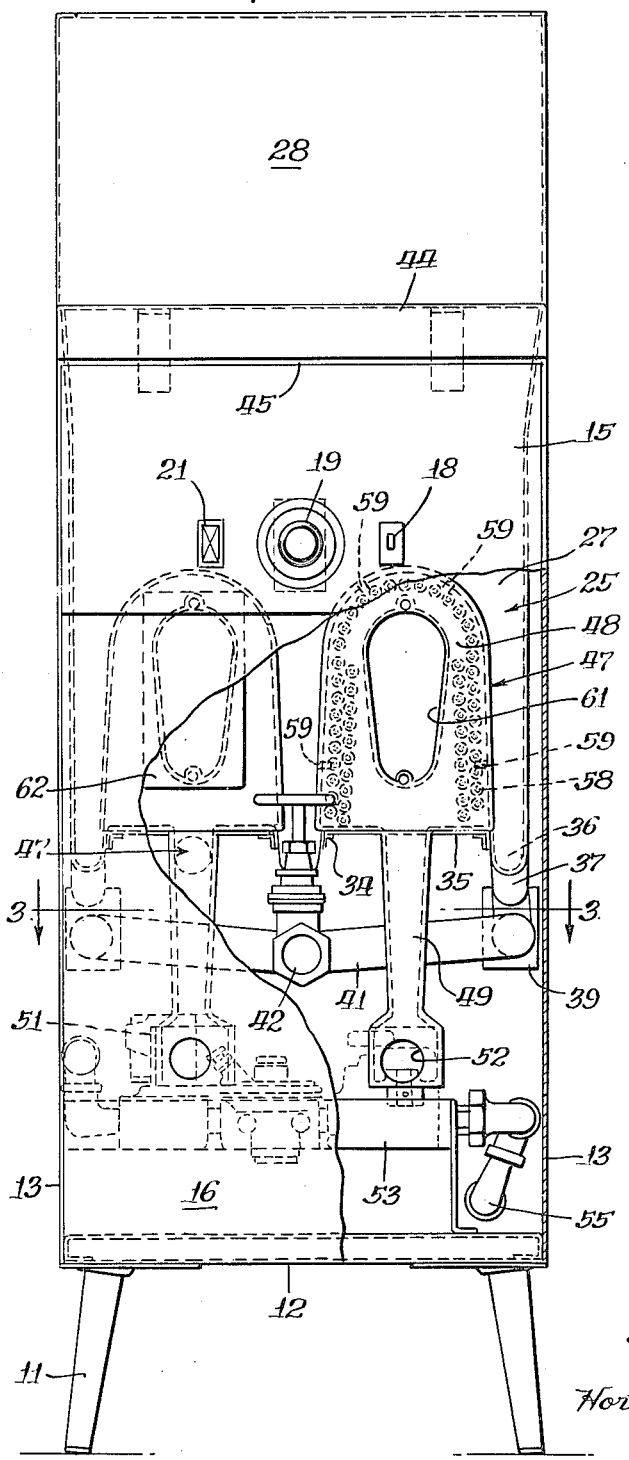
FIGURE 2 is a front elevational view of the fryer of FIGURE 1, as seen from the left of the latter, with parts broken away to show some of the interiorly disposed parts.

Referring more particularly to FIGURES 1 and 2, reference numeral 11 indicates suitable supporting legs that are attached in any well known manner to a base support 12 to which, in turn, are secured side walls 13 and a rear wall 14 of a cabinet which includes a front control panel 15 and a front door 16. The latter may be hingedly mounted in any suitable manner on one of the side walls 13, with a handle 17 (FIGURE 1) preferably struck therefrom to facilitate opening and closing thereof. The control panel 15 comprises a mounting for the controls employed, such as a main switch 18, a manually adjustable timer 19 and a signal light 21, and, as shown on FIGURE 1, is mounted at a forwardly and downwardly sloping angle relative to the front door 16 to provide an air inlet or slot 22. Another air inlet 23 also is provided at the lower front portion of the cabinet by terminating the base support 12 short of the front door 16. The rear wall 14 of the cabinet also is provided adjacent its lower end with an opening 24 which comprises another air inlet to the interior of the cabinet.

Figure 4:
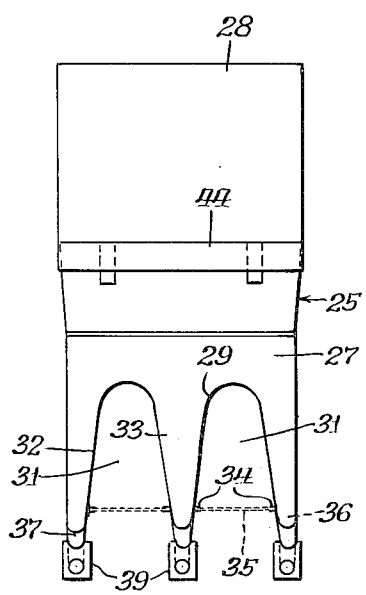
FIGURE 4 is a front elevational view of the cooking pot portion of the fryer.

Mounted in this cabinet structure is a cooking pot designated generally by reference numeral 25 which is made up in well known manner of side walls 26, front and rear walls 27 and 28, and a bottom wall 29 of unique construction. This bottom wall 29 is formed to provide laterally spaced combustion chambers 31 extending between the front and rear walls 27 and 28 and each defined by a pair of longitudinally extending portions 32 and 33 which, as best seen in FIGURE 4, slope upwardly toward each other and are joined at their upper ends to close the top of the combustion chamber.

Adjacent their lower ends, each of these wall portions 32 and 33 of the pot bottom 29 are provided on their opposing surfaces with substantially horizontal flanged brackets 34 of any suitable construction to provide opposing grooves for slidably receiving a plate 35. Each plate 35 thus defines the bottom of the associated combustion chamber 31 and functions as baffle means, in a manner that will better be understood from the following description, to prevent direct transfer of heat from the combustion chambers to the lower parts of the wall portions 32 and 33 extending below the slot-forming brackets 34. These lower parts of the wall portions 32 and 33 which extend below the combustion chambers 31 are joined to the next adjacent such wall portion or the vertical side walls 26, respectively, to define laterally separated cool zones 36 at the lower part of the pot bottom 29 at either side of each of the combustion chambers 31. The lower portions of the front and rear walls 27 and 28 of the pot 25 are shaped as illustrated in connection with the front wall 27 in FIGURE 4 to close the front and rear ends, respectively, of these cool zones 36 as well as the spaces communicating therewith and above the same, while leaving the ends of the combustion chambers 31 open.

Figure 3:
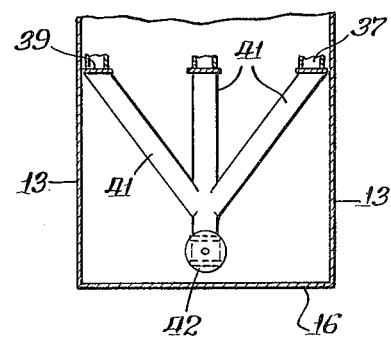
FIGURE 3 is a horizontal section on a reduced scale taken substantially on the line 3—3 of FIGURE 2.

That portion of the bottom wall 29 of the pot, as best seen in FIGURE 1, which defines each of the cool zones 36 includes a lowermost forward portion 37 extending rearwardly from the front wall 27 and a lowermost rearward portion 38 sloping downwardly from the rear wall 28. These lower portions 37 and 38 defining the bottom of each cool zone 36 are longitudinally aligned with each other from front to rear of the pot, with the rearward portion 38 terminating forwardly in vertically spaced relationship below the forward portion 37 near the longitudinal center of the pot. These lowermost portions 37 and 38 defining each of the cool zones 36 are joined together by a vertical wall portion 39 which is apertured to connect with the rear end of a forwardly extending drain pipe 41 that is secured thereto by welding, or in any other desired manner. As best shown in FIGURE 3, the three drain pipes 41 thus secured at their rear ends to, and communicating with, the wall portions 39 of the respective cool zones 36 are joined together at their forward ends and connected in any suitable manner to a manually operable drain valve 42 (FIGURE 1).

The front wall 27 of the pot 25 is offset forwardly to provide the usual drain shelf 43, and terminates at its upper end in a horizontal portion having a vertical flange 44 depending therefrom. The lower edge of this vertical flange 44 is disposed forwardly of, and in spaced relationship to, the upper edge of the control panel 15 to provide an additional air inlet 45 to the interior of the cabinet. As also shown in FIGURE 1, the rear wall 28 of the pot 25 extends considerably above the other walls of the pot to provide a splash panel and to function with the rear wall 14 of the cabinet to house means for raising and lowering automatically the baskets customarily employed to hold the food to be fried, if automatically raising and lowering means are employed, such as disclosed in my co-pending application Ser. No. 105,214 filed April 24, 1961. Suitable flue means 46 also is mounted interiorly of the cabinet for communication with the rear ends of the combustion chambers 31 in well known manner.

The high draft burner means which are employed to render effective the operation and use of the cooking pot above described comprise a burner, indicated generally by reference numeral 47, mounted in vertical position at the front end of each of the combustion chambers 31. Each of these burners 47 comprises a head 48 shaped to slightly marginally overlap the combustion chamber 31 and a riser and mixing chamber portion 49 extending downwardly therefrom and preferably formed integrally therewith. As shown in FIGURE 1, the lower mixing chamber portion of this riser 49 is cylindrical in shape and is provided with an apertured sleeve 51 mounted for selective rotational adjustment thereon. This sleeve has been removed from the right hand burner shown in FIGURE 2 to permit illustration of air inlet apertures 52 which are provided in the front and rear walls of the mixing chamber 49 for cooperation with the apertures in the adjustable sleeve 51 in well known manner. At its lower end, each burner 47 is connected to a gas manifold 53 which is supplied through a suitable thermostatically controlled valve 54 of any suitable construction from a gas supply pipe 55. A take-off 56 (FIGURE 1) from the supply pipe 55 provides gas in the usual manner to pilot lights 57 disposed to the rear and adjacent the bottom of each of the burner heads 48.

The head 48 of each burner comprises marginally disposed gas discharging nipples 58 in two rows (FIGURE 2) which are spaced from each other and extend rearwardly from the rear surface of the head 48 (FIGURE 1). Also formed integrally with the head 48 of each burner 47 are four rearwardly extending lugs 59 which are somewhat longer than the nipples 58 and are notched at their outer ends to engage against the inner surface of the combustion chamber 31 and the forward surface of the front pot wall 27, when the burners are mounted as illustrated herein, so as to properly position the burners and space the rear ends of the nipples 58 slightly forwardly of the front end of the associated combustion chamber 31. The preferred spacing in this respect and the resulting function of the burners will be described in further detail hereinafter.

In order to assure proper distribution of the mixture of gas and primary air supplied by the riser 49 to the several outlet nipples 58 of the head 48, the latter is given a ring-like form, with inner walls defining a central aperture 61 extending through the burner head, as shown by the right hand burner in FIGURE 2. With the instant mechanism, however, it is essential that this aperture 61 be closed. The forward wall of the burner head 48 therefore is rendered imperforate during operation of the burner by means of a plate 62 which is secured thereto in any suitable manner to close the aperture 61. The plate 62 has been removed from the right hand burner shown in FIGURE 2 merely to illustrate the central aperture 61 and the flow-directing function of its walls more clearly.

From the preceding description, it will now be more readily appreciated how the objects of this invention have been attained. Maximum heat transfer for efficient operation and to reduce the recovery time to a minimum has been attained by the combination of the semi-tube pot construction having the laterally spaced combustion chambers 31 extending the full front-to-rear length of the pot 25 and the separate cool zones 36 extending from the front wall 27 to the rear wall 28 and disposed below the combustion chambers, with the high draft burners 47 mounted in closely spaced relationship to the pot at the front ends of each combustion chamber 31. In the specific embodiment herein illustrated, the head 48 of each burner is spaced one-eighth of an inch in a front-to-rear direction of the fryer between the front wall 27 of the pot and the rear tips of the burner nipples 58. The latter extend rearwardly eleven-sixteenths of an inch from the rear face of the burner and are approximately three-eighths of an inch in outside diameter, with adjacent nipples spaced approximately one-eighth of an inch apart. There is thus provided an unimpeded peripheral area one-eighth of an inch wide surrounding each burner head, and a forward extension of that area eleven-sixteenths of an inch wide partially blocked by the nipples 58, the unblocked portions of which, together with such unimpeded portion, provide and define the only secondary air supply intake for the burner. With this arrangement and the major center portion of the burner being rendered imperforate by the plate 62, the gas and primary air mixture discharging rearwardly from the substantially marginally disposed gas nipples 58 creates an aspirating or Venturi-like effect on the secondary air to insure rapid and maximum combustion directly adjacent and along the side and top walls of the combustion chamber 31, with resulting maximum heat transfer through those walls to the cooking fat in the pot 25. This arrangement in connection with the combustion chamber 31 also provides maximum gas combustion volume. Maximum efficiency and minimum recovery time thus is effected. The primary air may enter the cabinet through the lower openings 23 and 24, while these same sources and the slots 22 and 45 will supply the secondary air.

At the same time, of course, with the location of the cool zones 36 being below the burner heads 48 and the provision of the baffle plates 35, heat will not be transferred directly from the combustion chambers to the cool zones. The resulting differences in temperatures between the fat or oil in the cool zones 36 and that in direct contact with the walls of the combustion chambers 31 will induce convection currents in the oil flowing out of and back into and through the cool zones. Any foreign material in the oil, such as crumbs, or particles dislodged from the food being fried, thus will be carried by such convection currents into the cool zones 36 and will be collected automatically at the points therein spaced furthest below the burner heads 48. As is best shown in FIGURE 1, such lowermost collection points for the material foreign to the cooking oil will be at the lower forward ends of the rearward portions 38 and adjacent the vertical wall portions 39. Consequently, all that is necessary to remove the foreign material from the cooking pot 25 is to swing open the front door 16, place a receiving receptacle adjacent the drain valve 42, and open the latter sufficiently and only long enough to let the resulting discharge of cooking oil therefrom carry with it the foreign material that has been collected at the low points of the cool zones. It will be understood, of course, that the arrangement of the drain pipes 41 and valve 42 also greatly facilitates maximum speed of emptying the cooking pot of all oil when that is desired. It will also be understood that the tilting of the wall portions 32 and 33 of each combustion chamber 31 toward each other results in widening of those interior portions of the pot 25 above the cool zones 36. This facilitates rapid heating of the cooking oil by accommodating the increasing volume of the oil resulting from its rising temperature, by providing a larger area for the side walls 32 and 33 than would be the case if they were vertical, and by so including those wall portions 32 and 33 that the burner flames will come into greater direct contact therewith than if they were vertical.

It is thought that the invention and many of its attendant advantages will be understood from the foregoing description, and it will be apparent that various changes may be made in the form, construction, and arrangement of the parts without departing from the spirit and scope of the invention or sacrificing all of its material advantages, the form hereinbefore described and shown in the drawings being merely a preferred embodiment thereof.

I claim:

1. A deep fat fryer, comprising a pot having front and rear end walls, longitudinal side walls and a bottom defining parallel combustion chambers extending from said front wall to said rear wall and each formed by a pair of longitudinal wall portions sloping upwarly toward each other and joined at their upper ends, with their lower ends extending below the combustion chambers and each joined to the next adjacent said longitudinal wall to provide laterally separated cool zones extending from front to rear interiorly of the pot and lower than the combustion chambers.

2. A deep fat fryer, comprising a pot having front and rear end walls, side walls and a bottom defining parallel cool zones interiorly of the pot and combustion chambers separating said cool zones and disposed above the same and having open lower ends, and baffle means disposed laterally of and above said cool zones for closing the lower ends of said combustion chambers.

3. A deep fat fryer, comprising a pot having front and rear end walls, side walls and a bottom wall defining parallel cool zones interiorly of the pot and combustion chambers separating said cool zones and disposed above the same and having open bottoms and front and rear ends, burner means mounted at the front ends of said combustion chambers, flue means connected to the rear ends of said combustion chambers, and baffle means for closing the bottoms of said combustion chambers to prevent transmission of heat from said burner means directly to said cool zones.

4. A deep fat fryer according to claim 3, wherein those parts of said bottom wall defining said cool zones include forward portions extending rearwardly from said front wall and rearward portions sloping downwardly from said rear wall longitudinally aligned respectively with said forward portions and terminating forwardly in vertically spaced relationship below said forward portions.

5. In a deep fat fryer according to claim 4, drain means comprising forwardly extending conduits interconnected at their rear ends with said cool zones adjacent the forward ends of said rearward portions, and valve means connected to the forward ends of said conduits.

6. A deep fat fryer, comprising a pot having front and rear end walls, side walls and a bottom wall defining parallel cool zones extending from front to rear internally of the pot and a combustion chamber separating said cool zones and disposed above the same and exteriorly of the pot with open lower, front and rear ends; a burner, having a head with an imperforate back portion and a face plate with fuel apertures therein, disposed adjacent the front end of said combustion chamber to direct a mixture of fuel and primary air from said apertures rearwardly into said chamber; means for mounting said burner head in closely spaced relationship to the front end wall of said pot to provide a narrow space peripherally of the burner head for the entrance of secondary air into said combustion chamber to produce an aspirating effect; flue means connected to the rear end of said combustion chamber; and baffle means for closing said lower end of said combustion chamber to prevent transmission of heat from said burner means directly to said cool zones disposed laterally therebelow.

7. A deep fat fryer according to claim 6, wherein those parts of said bottom wall defining said cool zones are disposed below said baffle means and comprise front portions extending rearwardly from said front wall, and rear portions sloping downwardly and forwradly from said rear wall and terminating at their forward ends in verticaly spaced relationship to and below the rearward ends of the laterally associated said front portions, vertical wall portions joining the associated said front and rear portions, and drainage means interconnected with said cool zones through said vertical wall portions.

8. A deep fat fryer, comprising a pot having front, side and rear walls, and a bottom wall formed to provide laterally spaced combustion chambers having open ends and bottoms and adjacent cool zones parallel therewith, extending from said front to said rear walls, closed at their ends thereby and disposed below said combustion chambers; a high draft burner mounted to substantially close the open front end of each combustion chamber, comprising a head shaped to slightly marginally overlap the combustion chamber, gas discharge nipples spaced from each other and extending rearwardly from said head adjacent marginal portions thereof, means for supplying primary air and gas to said head for discharge from said nipples into said combustion chamber, and means for spacing the rear ends of said nipples slightly forwardly of the front end of said combustion chamber, whereby secondary air is supplied to said combustion chamber only through a narrow space surrounding said burner head; and a baffle plate closing the open bottom of each combustion chamber to deflect heat from the associated burner away from said cool zones.

References Cited by the Examiner

UNITED STATES PATENTS

| | | | |
|---|---|---|---|
| 1,923,639 | 8/1933 | O'Dowd. | |
| 2,182,735 | 12/1939 | O'Dowd | 126—391 |
| 2,360,727 | 10/1944 | Shaw. | |
| 2,431,753 | 12/1947 | Holderle et al. | 126—391 |
| 2,535,905 | 12/1950 | Dawson. | |
| 2,712,308 | 7/1955 | Keating | 126—391 |
| 3,060,922 | 10/1962 | Wilson | 126—391 |

JAMES W. WESTHAVER, *Primary Examiner.*

ROBERT A. DUA, *Examiner.*